US00RE38210E

(19) United States
(12) Reissued Patent
Plath et al.

(10) Patent Number: US RE38,210 E
(45) Date of Reissued Patent: Aug. 12, 2003

(54) METAL SHINGLE WITH GUTTER AND INTERLOCKING EDGES

(75) Inventors: David J. Plath, Edwards, CO (US); James M. Buster, Eagle Vail, CO (US)

(73) Assignee: Vail Metal Systems, LLC, Vail, CO (US)

(21) Appl. No.: 09/276,610

(22) Filed: Mar. 25, 1999

Related U.S. Patent Documents

Reissue of:
(64) Patent No.: 5,613,337
Issued: Mar. 25, 1997
Appl. No.: 08/449,779
Filed: May 24, 1995

(63) Continuation of application No. 08/218,286, filed on Mar. 25, 1994, now abandoned.

(51) Int. Cl.[7] ..... E04D 1/00

(52) U.S. Cl. ..... 52/533; 52/519; 52/523; 52/529; 52/520; 52/534; 52/539; 52/541; 52/545; 52/547; 52/555; 52/537; 52/578; 52/536

(58) Field of Search ..... 52/519, 520, 523, 52/525, 527, 529, 530, 533–536, 539, 541, 545–547, 555, 556, 578

(56) References Cited

U.S. PATENT DOCUMENTS 1,410,299 A * 3/1922 Harshberger ..... 52/535
1,643,445 A * 9/1927 Call ..... 52/530
1,653,085 A 12/1927 Buckley
2,243,256 A * 5/1941 Miller ..... 52/520
2,380,398 A 7/1945 Booth
3,209,506 A * 10/1965 Waske
3,216,741 A * 11/1965 Newlin et al.
3,269,075 A * 8/1966 Marini et al.
3,347,001 A * 10/1967 Cosden
4,185,436 A * 1/1980 Vallee
4,218,857 A * 8/1980 Vallee
4,233,795 A * 11/1980 Snyder et al. ..... 52/520 X
4,271,652 A * 6/1981 Svensson ..... 52/520 X
4,593,512 A * 6/1986 Funaki ..... 52/519

OTHER PUBLICATIONS

AEP–SPAN, publication by the Dallas Corporation, 1 sheet showing a Gable Sanp–Seam, Jul. 1988.*
Architetural Sheet Metal Manual, SMACNA pp. 200 and 243, Jul. 1988.*

* cited by examiner

*Primary Examiner*—Robert Canfield
(74) *Attorney, Agent, or Firm*—Lowe Hauptman Gilman & Berner, LLP

(57) ABSTRACT

A shingle is formed with a first, or trailing, side edge folded over toward the top surface of the shingle to catch moisture and direct it down to the top surface of the next lower shingle. A second, or leading, side edge of the shingle is not folded. An "S" shaped fold, spaced apart from the trailing edge fold, receives the unfolded leading edge of an adjacent shingle. The tailing edge and S fold form a gutter under the leading edge of the adjacent shingle. The top edge of the shingle is folded-over toward the top surface of the shingle for engagement with the folded-under lower edge of the next higher shingle. The folded-over top edge extends to the right or leading edge of the shingle and slides under the left edge of the folded-over top edge of the next adjacent shingle to the fight side. The folded-under lower edge extends along the lower edge of the shingle but leaves a gap relative to the folded-under lower edge of the lateral adjacent shingle. In this way water is caught by the gutter and flows out the gap between folded-under lower edges of laterally adjacent shingles. One or more S-shaped folds are also made in the middle of the shingle to form a panel having the appearance of multiple shingles.

20 Claims, 6 Drawing Sheets

METAL SHINGLE WITH GUTTER AND INTERLOCKING EDGES

Matter enclosed in heavy brackets [ ] appears in the original patent but forms no part of this reissue specification; matter printed in italics indicates the additions made by reissue.

CROSS-REFERENCE TO RELATED APPLICATION

This patent application is a continuation of patent application Ser. No. 08/218,286, filed on Mar. 25, 1994, entitled Metal Shingle Design (now abandoned).

BACKGROUND OF THE INVENTION

1. Field of the Invention:

This invention relates to roofing shingles and more particularly to a metal shingle having interlocking folding edges designed to prevent moisture from migrating around the edges of the shingle and folds in the middle of the shingle.

2. Description of the Prior Art:

Metal shingles with interlocking edges are known in the art. U.S. Pat. Nos. Vallee 4,185,436, Vallee 4,218,857, Cosden 3,347,001, Marini et al. 3,269,075, Newlin et al 3,216,741 and Waske 3,209,506 all disclose interlocking edges.

A problem with the prior art interlocking-edge shingle design is that water tends to migrate around the edges of a metal, or smooth surface, shingle. This problem is particularly prevalent at the corners of the shingle where the folded edges may leave a gap close to the surface of the shingle. Also, the water tends to migrate around the interlocking folds at the side edges of the shingle.

SUMMARY OF THE INVENTION

It is the object of the present invention to provide a shingle with interlocking edges that is resistant to water moisture creeping around the edges of the shingle.

In accordance with this invention, the above problems have been solved and the above object has been accomplished with a shingle whose side edges overlap with the next adjacent shingle. A first, or trailing, side edge is folded over toward the top surface of the shingle to catch moisture creeping toward this side edge and to direct moisture down the shingle to the top surface of the next lower shingle. A second, or leading, side edge of the shingle is not folded. Another fold, spaced inwardly from the trailing side edge fold, and between the trailing side fold and the leading edge is an "S" shaped fold in the surface of the shingle. This S fold receives the unfolded leading edge of an adjacent shingle inserted into the S fold. As a result, the fold at the trailing side edge, the S fold, and the top surface of the shingle between the trailing edge fold and the S fold form a gutter under the leading side edge of the adjacent shingle. Accordingly, any moisture that manages to migrate around the S fold and under the leading side edge of the adjacent shingle is caught by this gutter and flows down the gutter to the top surface of the next lower shingle on the roof.

The top edge of the shingle is folded-over toward the top surface of the shingle for engagement with the folded-under lower edge of the next higher shingle on the roof. The folded-over top edge extends all the way to the right edge of the shingle so that it slides under the left edge of the folded-over top edge of the next adjacent shingle to the right side. The folded-under lower edge extends along the lower edge of the shingle but preferably leaves a gap relative to the folded-under lower edge of the next adjacent side shingle. In this way, water is restrained from migrating over the top edge of the shingle and is allowed to flow out the gap between respective folded-under lower edges of the adjacent shingles.

As a preferred feature of the present invention, one or more S-shaped folds may also be made in the middle or midsection of the shingle to form a panel that has the appearance of multiple shingles. For a viewer, the end of a smaller simulated shingle is indistinguishable from the end of the panel.

Other objects, advantages and features of the invention will be understood by those of ordinary skill in the art after referring to the complete written description of the preferred embodiments of the invention in conjunction with the following drawings.

DETAILED DESCRIPTION OF THE PREFERRED EMBODIMENTS

Figure 1:
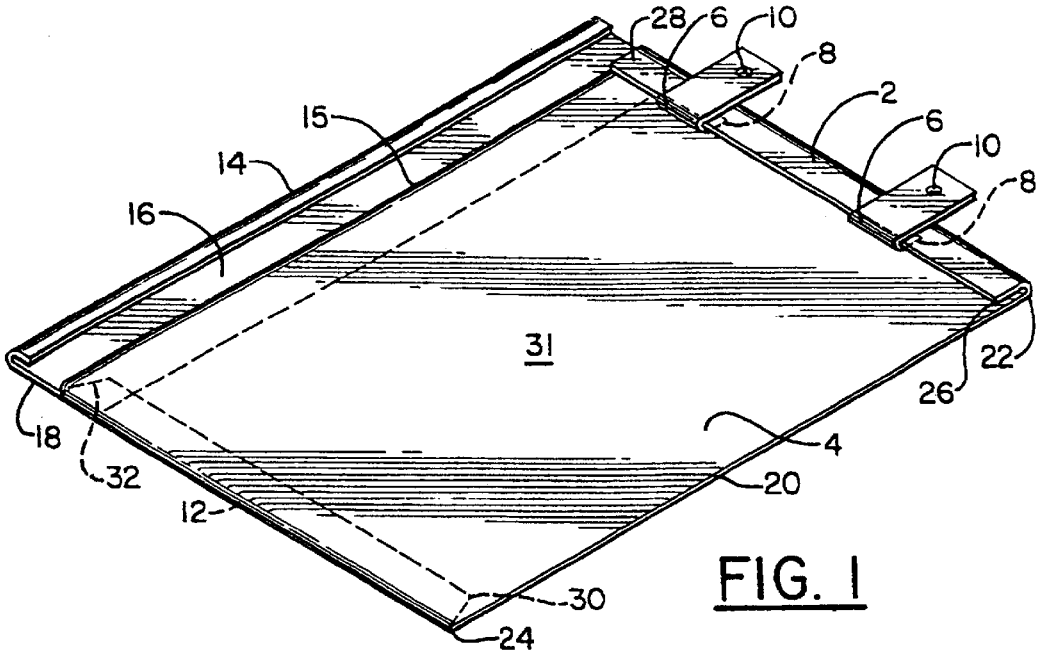
FIG. 1 is a perspective view of a shingle in accordance with one preferred embodiment of the present invention.

FIG. 1 shows a top view of a preferred embodiment of the shingle 31. Upper edge 2 is folded-over to the top plan surface 4 to allow engagement with mounting bracket 6, or with the lower edge 12 of the next higher shingle. Mounting bracket 6 has a folded-under lower edge 8 and a hole 10. The bracket lower edge 8 is hooked onto the shingle upper edge 2 and nailed to the roof (not shown) through hole 10 to hold the shingle 31 in place on the roof (not shown).

The shingle lower edge 12 is folded under for engagement with the upper edge fold 2 of the next lower shingle. The left side, or trailing, edge 14 is folded-over toward the top surface of the shingle 31. The shingle top surface has an S fold 15 spaced inwardly from the trailing edge 14 that divides a gutter surface 16 from the rest of the top surface 4 of the shingle 31. Thus, water flowing to the left side of the shingle 31 over the S fold 15 is caught in a gutter formed by trailing edge 14, gutter surface 16 and S fold 15. The water caught by the shingle gutter surface 16 is directed to flow down to the open lower edge 18 of the shingle and is prevented by folded trailing edge 14 from flowing under the adjacent shingle adjacent to the left side of shingle 31, and instead is guttered onto the center of the top of the next lower shingle.

Figure 8:
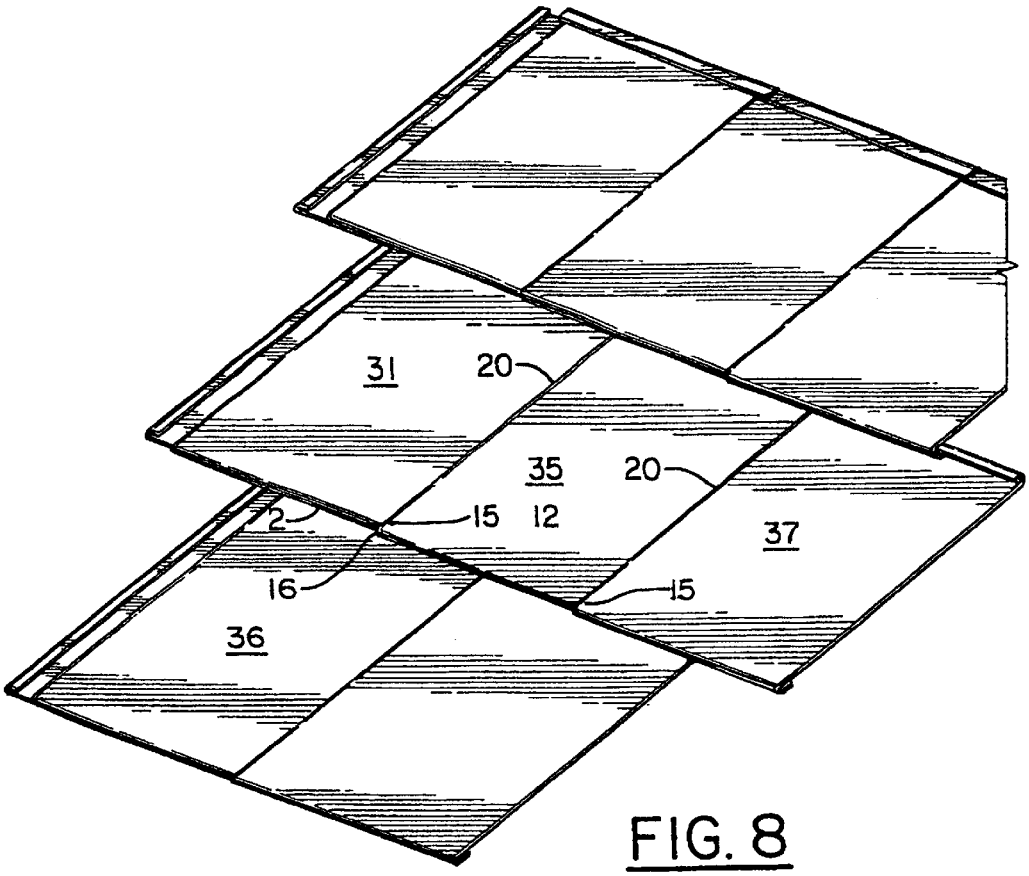
FIG. 8 is a perspective view of a plurality of the shingles of FIG. 1 as interlocked and mounted on a roof.

The arrangement of several interlocked shingles 31, 35, 36, 37, of which shingle 31 is typical is shown in FIG. 8. The right side, or leading, edge 20 of the shingle 31 (FIG. 1) is not folded. To assemble adjacent shingles 31 together, as illustrated by shingles 31, 35, 37 in FIG. 8, this leading edge 20 of one of the shingles, for example, shingle 31, is positioned over the trailing edge 14 and gutter surface 16 and inserted into S fold 15 of a next adjacent shingle located to the right of the shingle 35. When so assembled, the gutter surface of one shingle 35 is covered by the leading edge 20 of the adjacent shingle 31, but any water that gets under leading edge 20 and onto the gutter surface 16 will run out of the open lower edge 18 (FIG. 1), as described above, onto the top surface of the next lower shingle 36 (FIG. 8).

Referring again to FIG. 1. The upper folded-over edge 2 has a leading-side edge 26, which extends all the way to edge 20 and slides over the upper trailing side edge 28 of the folded over edge 2 of the next shingle to the left when right edge 20 of that next shingle to the left is inserted into fold 15. Accordingly, when the next adjacent shingle to the left has its leading edge 20 inserted into S fold 15 of shingle 31, the trailing-side edge 28 of fold-over edge 2 will underlap the leading-side edge 26 of the fold-over edge 2 of the shingle to the left being inserted.

The lower folded-under edge 12 has a leading-side edge 30 which can be tapered, or slant cut, from the right side leading edge 20 to provide for easy insertion of leading edge 20. The trailing-side edge 32 of the fold-under lower edge 12 can also be slant cut back from the trailing side of the S fold 15. Thus, when the leading edge 20 of the next adjacent left side shingle is inserted into S fold 15, there will be a gap between folded-under edge 12 of the shingle 31 with the folded-under edge of the inserted shingle. This gap allows water flowing down the gutter surface 16 and caught by the folded-under edge 12 of the inserted shingle to flow out onto the top surface of the next lower shingle.

Figures 2, 3, 4, 6:
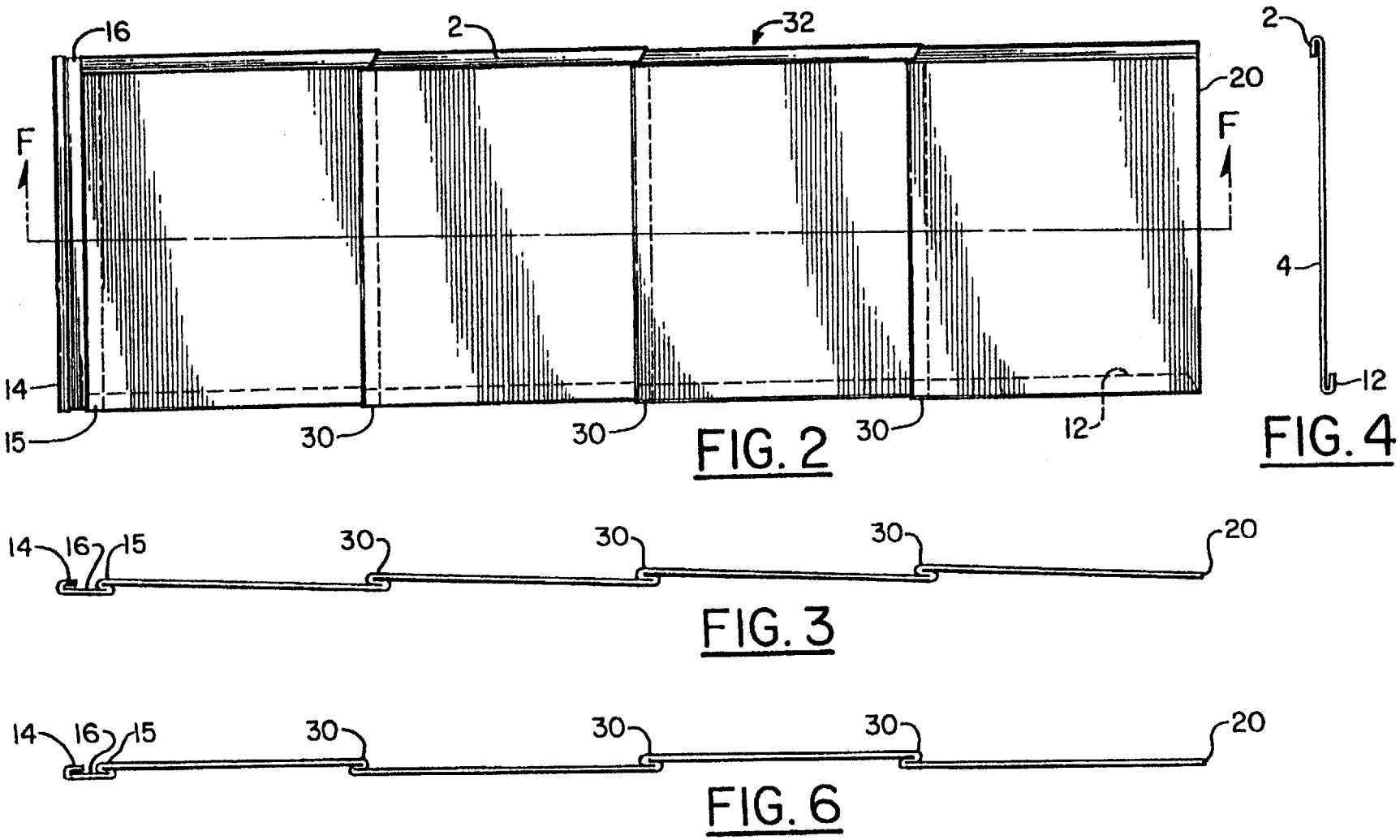
FIG. 2 is a top plan view of another preferred embodiment of the invention with a large shingle panel having four S folds to give the appearance of four shingles.
FIG. 3 is a lower edge view of the shingle panel in FIG. 2 and also is representative of a cross-section of the shingle panel cut along line F in FIG. 2.
FIG. 4 is a side elevation view of the leading edge side of the shingle panel in FIG. 2.
FIG. 6 is a lower edge view of the shingle panel of FIG. 5 and is also representative of a cross-section of the shingle panel cut along line A in FIG. 5.

In FIG. 2, a plurality of folds 30 are made in a large shingle 32 to form a panel giving the appearance of it being a plurality of smaller subshingles. Shingle panel 32 is preferably cut and folded from some decorative metal such as copper or metal protected by resin based coating system (Kynar 500 is a registered trademark of Elf Atochem North America, Inc.) Kynar 500. Its dimensions are around 31.4 inches wide by 11 inches high. Three folds 30 are made to form shingle panel 32 into four subshingles 7.4 inches wide by 9.75 inches high, dimensions similar to standard cedar shake or slate roofing. All four S folds 15 and 30 have the same orientation, so that the four small subshingles have their left sides slightly higher than their right sides. This feature is especially apparent in FIG. 3.

FIG. 3 shows a lower edge view of the shingle panel 32 of FIG. 2 and is also representative of a cross-section cut along line F. The amount of space between the folded surfaces is exaggerated for clarity. Folds 14, 15, and 30 are all approximately one half inch deep. Folds 14, 15, and 30 are made before folds 2 and 12.

FIG. 4 shows a side view of shingle panel 32. Fold 12 and fold 2 are approximately three quarters of an inch deep.

Figure 5:
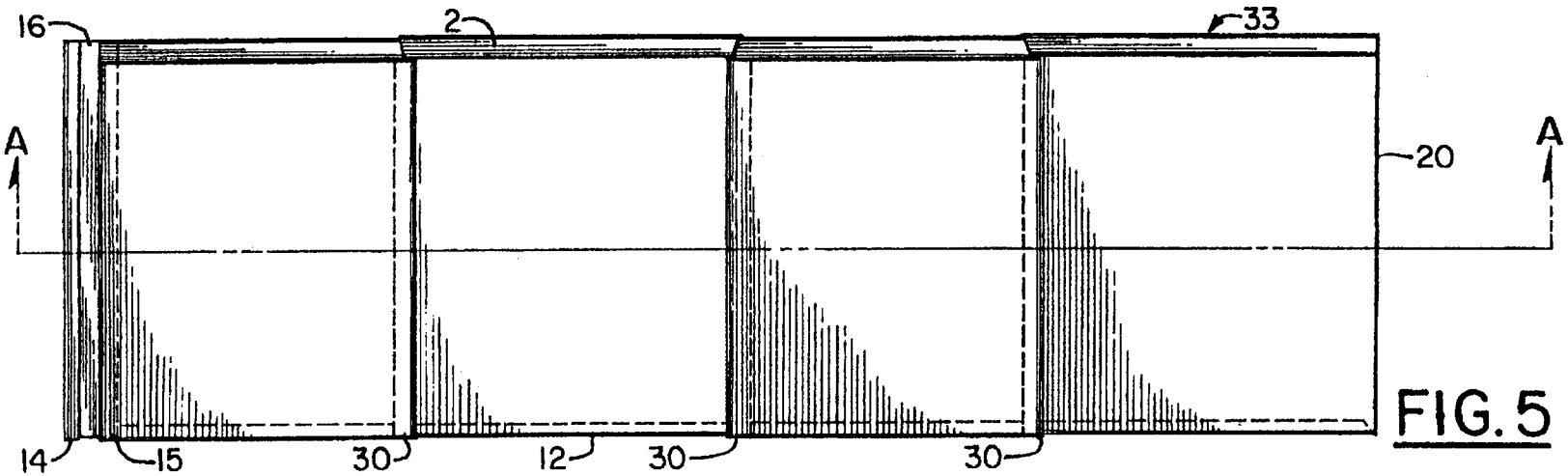
FIG. 5 is a top plan view of a third preferred embodiment of a shingle panel similar to FIG. 2, but with the S folds alternately facing left and right.
Figure 9:
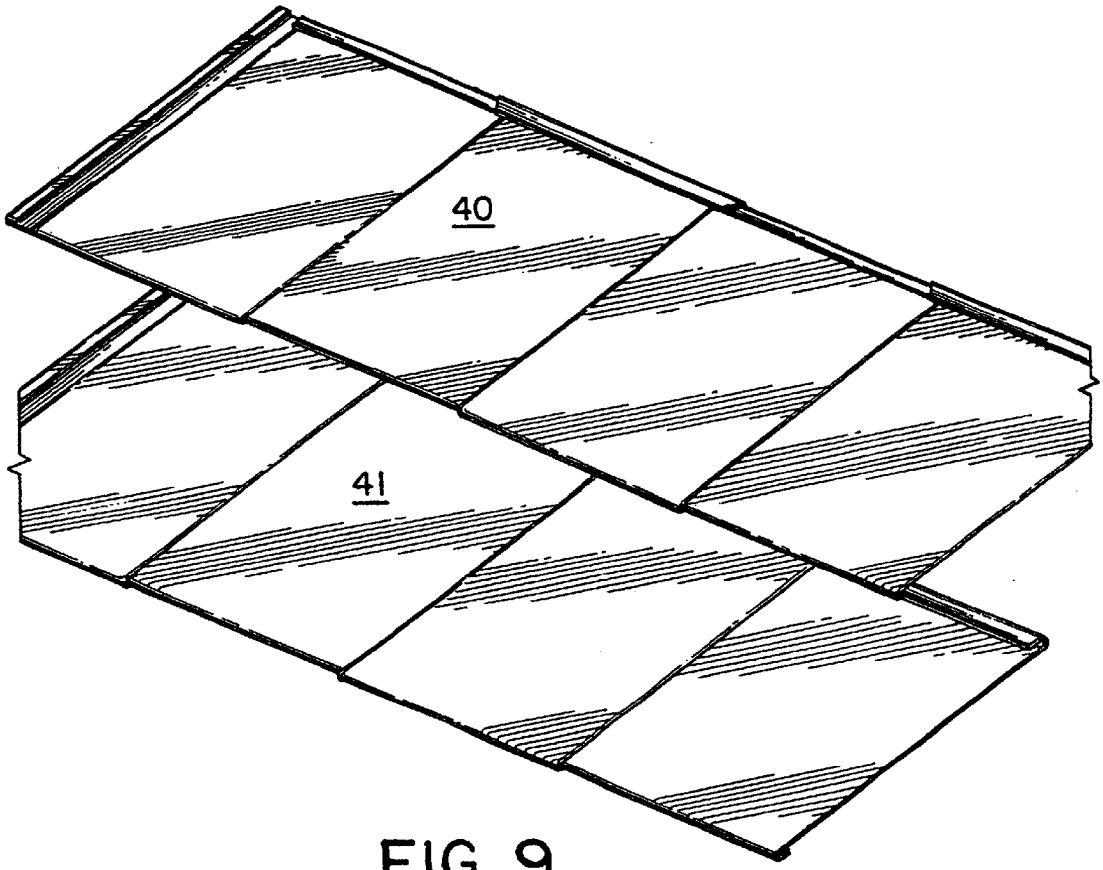
FIG. 9 is a perspective view of two of the shingle panels of FIG. 5 as interlocked and mounted on a roof.
Figure 10:
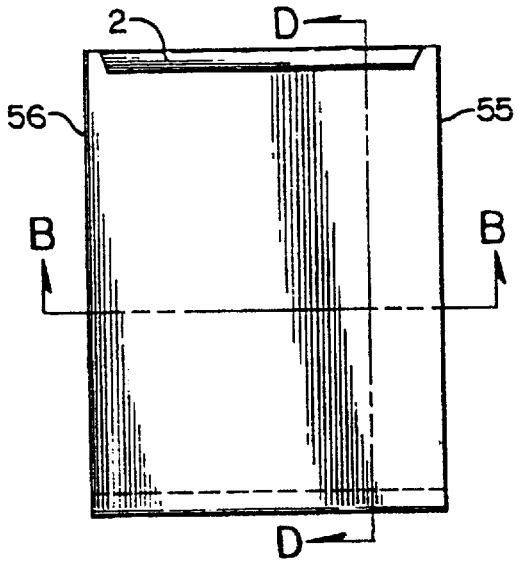
FIG. 10 is a top plan view of a shingle in accordance with a fourth embodiment of the present invention.

In a third preferred embodiment, shown in FIGS. 5 and 6, the shingle panel is folded to form many small subshingles, but every other subshingle is slightly higher than its neighbor. This effect is accomplished by making folds 30 in alternating directions within shingle panel 33, as shown in FIG. 5. In FIG. 6, it can be seen that the alternating pattern of high and low subshingles will be carried into the next shingle panel on both sides. Low end 20 is inserted into high fold 15 of the next shingle panel. FIG. 9 shows two of the shingle panels of FIG. 5 interlocked as they would be for mounting on a roof.

Figure 7:
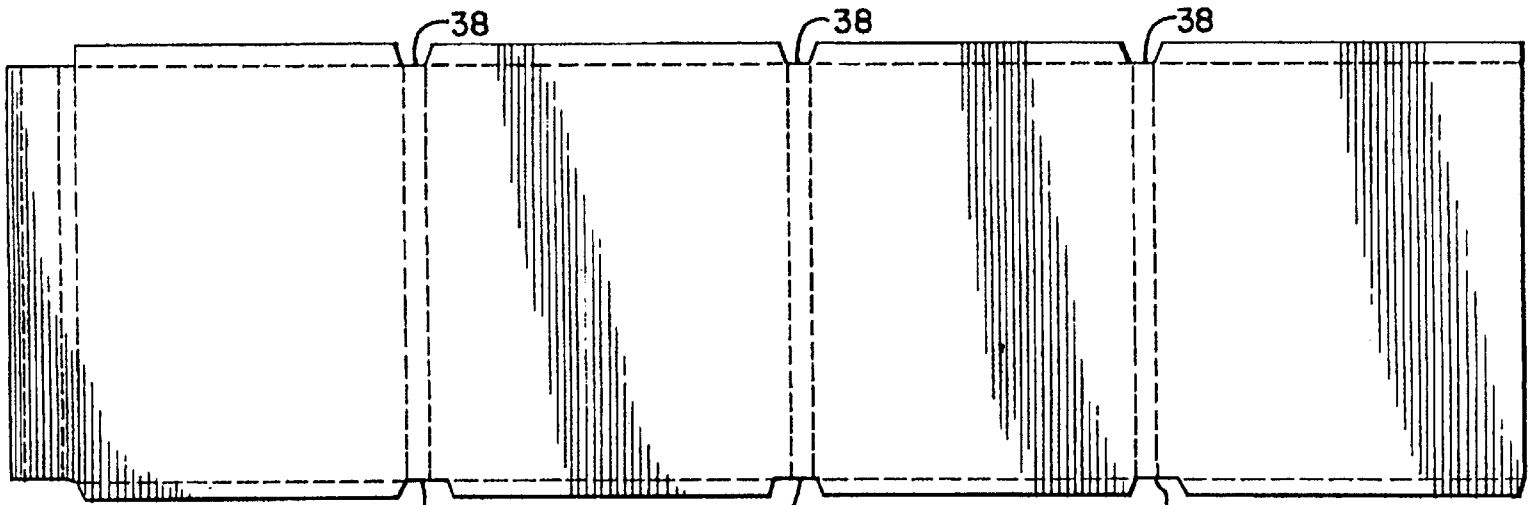
FIG. 7 shows a top plan view of a metal sheet pattern of the shingle panel of FIG. 5 before it is folded with the intended folds shown in broken lines.

FIG. 7 shows the shingle panel of FIG. 5 before it is folded. The dotted lines indicate where folds will occur. FIG. 7 shows that the cuts 38 made in the top edge 2 of shingle 33 are smaller than the cuts 39 made in the lower edge 12. Large cuts 39 leave slight gaps in folded-under edge 12 to allow water to flow down folds 30, through the gaps, and out onto the shingle below. Cuts 38 are smaller, so that no gap is left in folded-over edge 2. Thus, there is no gap in the folded-over top edge 2 so that water migrating up a shingle cannot flow through a gap onto the roof under the shingles.

FIG. 8 shows eight of the shingles of FIG. 1 interlocked. Shingle 35 is located so that its gutter 16 guides water into the center of the top surface of shingle 36. Also, fold 2 of shingle 36 is inserted into fold 12 of shingle 35. Shingle 37 is to the right of shingle 35, and edge 20 of shingle 35 is inserted into fold 15 of shingle 37.

FIG. 9 shows two of the shingle panels of FIGS. 5 and 6 interlocked. Top panel 40 is above, and offset from, lower panel 41. As seen in FIG. 9, when several panels according to the present invention are interlocked, it is impossible to discern whether a fold is the end of a panel or a fold 30. In the preferred embodiment of FIGS. 5 and 6, the heights of the subshingles alternate. Interlocked shingle panels of the preferred embodiment shown in FIGS. 2 through 4 would have the left side of each small subshingle slightly higher than the right side. Thus, their appearance is exactly the same as interlocked shingles of the preferred embodiment of FIG. 1.

Figure 11:
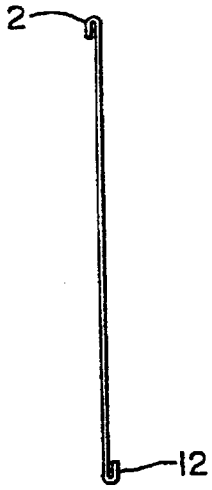
FIG. 11 is a side elevation view of the shingle of FIG. 10 and is also representative both of a cross-section of the FIG. 10 shingle embodiment taken along line D as well as a cross-section of the shingle of FIG. 13, taken along line E.
Figure 12:
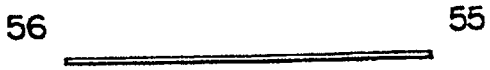
FIG. 12 is a cross section view of the shingle of FIG. 10, taken along line B.
Figure 13:
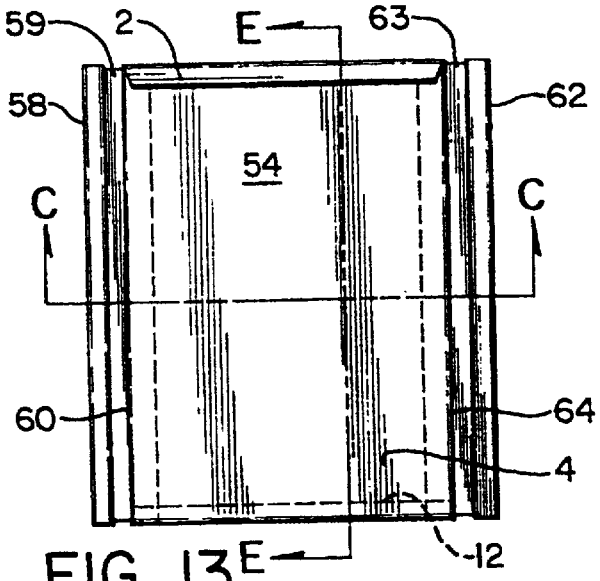
FIG. 13 is a top plan view of another shingle in accordance with the fourth embodiment of the invention.

FIGS. 10 through 14 show a fourth preferred embodiment of the present invention. FIG. 13 shows a shingle 54 designed to interlock with shingle 53 of FIG. 10 on either side, on the top, or on the bottom. Shingle 53 has two unfolded edges 55 and 56 which can slide into S-folds 60 and 64, respectively, of a shingle 54. Shingle 54 also has folds 58 and 62 which combine with folds 60 and 64 to form gutters 59 and 63.

Figure 14:
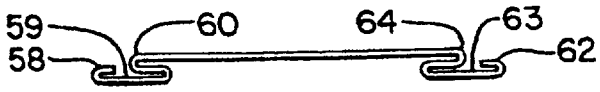
FIG. 14 is a lower edge view of the shingle of FIG. 13 and is representative of a cross-section taken along line C.

FIG. 12 shows a lower edge view of shingle 53 and is also representative of a cross-section taken along line B. FIG. 14 shows a lower edge view of shingle 54 and is also representative of a cross-section taken along line C. As is apparent from these drawings, right edge 55 of shingle 53 can slide into left S-fold 60 of shingle 54, or left edge 56 can slide into right S-fold 64, interlocking the two shingles. The top surface 4 of shingle 53 is depressed slightly lower than the top surface 4 of shingle 54 when the two are interlocked, as described above.

The two shingles 53 and 54 also interlock vertically. FIG. 11 shows a side view which is accurate for both shingles 53 and 54. Thus, top fold 2 of shingle 53 slides into bottom fold 12 of both shingles 53 and 54 of the upper course of shingles. As well, the top fold 2 of shingle 54 slides into bottom fold 12 of both shingle 53 and 54 of the upper course of shingles.

When several of shingles 53 and 54 are interlocked, they have the same appearance of varying height shown in FIG. 9.

Figure 15:
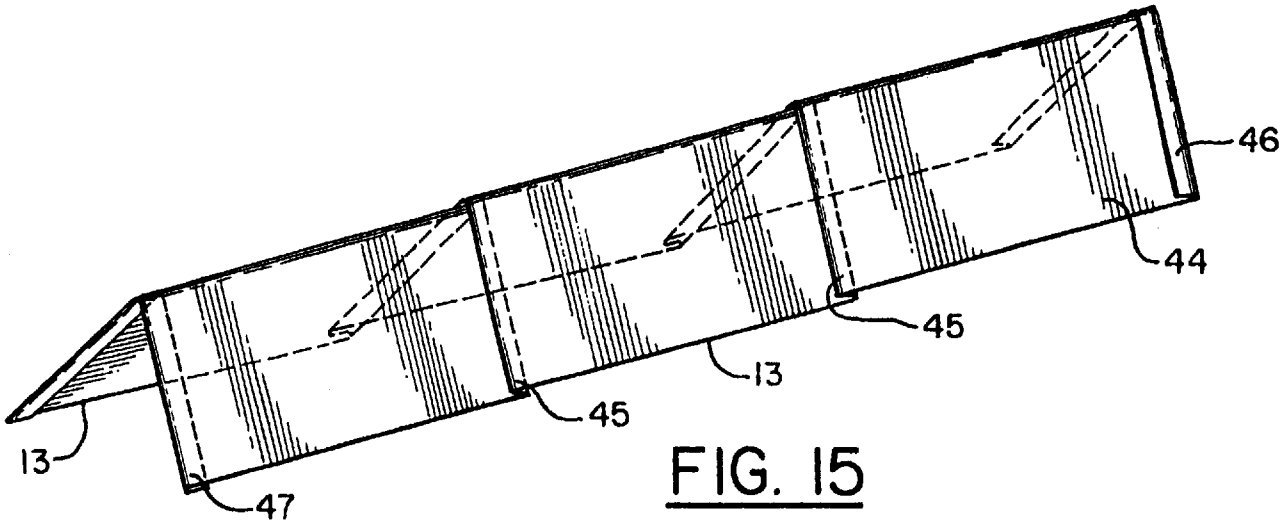
FIG. 15 is a perspective view of a hip and ridge panel designed to interlock with any of the preferred embodiments of the present invention.

FIG. 15 shows a hip and ridge panel 44. Fold 46 folds upward and fold 47 folds under so that fold 46 of one hip and ridge interlocks with fold 47 of the next hip and ridge to the right. Hip and ridge panel 44 will be folded under about one half inch at edges 13 once the desired vertical length is determined. The fold formed at edges 13 is for appearance only, and does not interlock with any of the shingles described herein. S-folds 45 form three small hip and ridge sections in the large panel 44.

Figure 16:
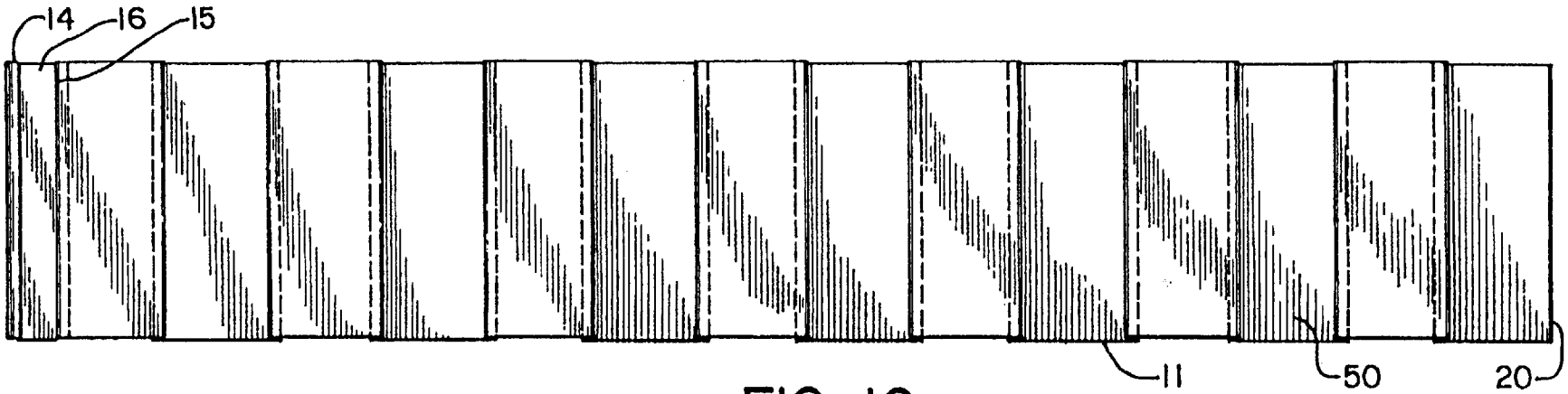
FIG. 16 is a top plan view of a universal endwall panel designed to interlock with any of the preferred embodiments of the present invention.

FIG. 16 shows a universal endwall 50. Right edge 20 is unfolded to allow insertion into S-fold 15 of another endwall. Fold 14, together with fold 15, forms gutter 16. Endwall 50 will be folded under around one half inch at edge 11 once the desired length is determined. The fold formed at lower edge 11 will thus interlock with any of the shingles described herein.

While the invention has been described with respect to preferred embodiments thereof, it will be understood by those skilled in the art that various changes in detail may be therein without departing from the spirit scope, and teaching of the invention.

What is claimed is:

1. A substantially planar roofing shingle having a top surface and a bottom surface, and further comprising:

at least one side edge of the shingle folded over the top surface of the roofing shingle to form one side wall of a gutter with the side wall extending from an upper edge to a lower edge of the shingle, said upper edge being folded-over toward the top surface, and said lower edge being folded under toward the bottom surface in a manner that is adapted to engage a folded-over upper edge of a lower adjacent shingle;

an S shaped fold, spaced apart from the folded over side edge fold, to form another gutter side wall extending from the upper edge to the lower edge of the shingle, a fold of said S shaped fold adapted to receive a side edge of a lateral adjacent shingle;

the gutter side walls formed by said S shaped fold and said folded over side edge, and the top surface of the roofing shingle between the S shaped fold and the folded over side edge forming the gutter, said gutter for catching water migrating around the S shaped fold and under a laterally adjacent shingle, the gutter adapted to guide the water caught by the gutter to a top surface of a lower adjacent shingle.

2. The roofing shingle of claim 1, wherein:

the folded-over upper edge of the roofing shingle is adapted to overlap a folded-over upper edge of a laterally adjacent shingle when the shingles are engaged so that water flowing along the gutter of the roofing shingle cannot flow up under a higher adjacent shingle; and the folded-under lower edge of the roofing shingle is adapted to provide a gap between the folded-under lower edge and a folded-under lower edge of the laterally adjacent shingle, the gap being adjacent the gutter of said roofing shingle so that water flowing along said gutter can flow down onto the lower adjacent shingle.

3. The roofing shingle of claim 1 and in addition:

multiple folds in the surface of the roofing shingle at regularly spaced intervals to form the appearance of multiple shingles.

4. The roofing shingle of claim 3 wherein said multiple folds alternate in direction.

5. The roofing shingle of claim 3 wherein said multiple folds are all oriented in the same direction.

6. A roofing shingle having a top surface, a bottom surface, and a lower edge, further comprising;

a trailing side edge folded over toward the top surface of the roofing shingle;

a leading side edge which is unfolded;

an S shaped fold spaced apart form the trailing edge fold for receiving an unfolded leading edge of a lateral adjacent shingle;

said S shaped fold, said trailing edge fold, and the top surface of the roofing shingle between the S shaped fold and the trailing edge fold forming a gutter for guiding water from the top surface of the roofing shingle to a top surface of a lower adjacent similar shingle;

multiple folds in the roofing shingle at regularly spaced intervals to form the appearance of multiple shingles; and a plurality of gaps in said lower edge adjacent said multiple folds for allowing water to migrate along said multiple folds and out onto said lower adjacent shingle.

7. A roofing shingle, comprising:

a trailing edge;

a first S shaped fold spaced inwardly from the trailing edge;

a leading edge adapted for insertion into an S shaped fold of a lateral adjacent shingle;

a plurality of additional S shaped folds to form an appearance of multiple shingles;

said trailing edge is folded over for forming a gutter between said trailing edge fold and said first S shaped fold;

an upper edge folded-over toward a top surface of the roofing shingle; and a lower edge folded-under toward a bottom surface of the roofing shingle for engagement with an upper edge of a lower adjacent similar shingle.

8. The roofing shingle of claim 7 and wherein the folded-under lower edge is cut away to form a plurality of gaps in said lower edge adjacent to said multiple folds for allowing water caught by the folded under lower edge to flow out onto a lower adjacent similar shingle below.

9. The roofing shingle of claim 7, wherein the folded-over upper edge is cut to form a plurality of laterally spaced apart folded-over upper edges that overlap at each S shaped fold when the S shaped folds are formed, the overlapped upper edges preventing water migrating up the S shaped folds from flowing over the upper edge of the shingle.

10. A roofing system comprising a plurality of shingles in which each shingle has a top surface and a bottom surface extending between an upper edge and a lower edge and between a first lateral edge and a second lateral edge, [a first one of said shingles having] *and in which each shingle further has:*

(*i*) *said upper edge folded over said top surface;*

(*ii*) *said lower edge folded under said bottom surface;*

(*iii*) said first lateral edge folded over toward [its] *said* top surface to form one side wall of a gutter with said one side wall extending substantially from the upper edge to the lower edge*; and*

(*iv*) an S-shaped fold spaced apart from the one side wall of the gutter to form another sidewall of the gutter extending substantially from the upper edge to the lower edge[.]*;*

[said]*a* first one of said shingles being positioned over a part of a second one of said shingles *with the folded over upper edge of the second one of said shingles engaged with the folded under lower edge of the first one of said shingles* such that the *folded over* upper edge of the second one of said shingles underlays the bottom surface of the first one of said shingles and *overlays the folded under lower edge of said first one of said shingles, and such that* the *folded under* lower edge of the first one of said shingles overlays the top surface of the second one of said shingles *and underlays the folded over upper edge of the second one of said shingles, and further* in such a manner *that* said gutter channels water caught in said gutter onto the top surface of said second one of said shingles*; and*

*wherein the second lateral edge of a third one of said shingles is inserted into the S-shaped fold of said first one of said shingles in such a manner that a portion of said third one of said shingles overlays the gutter of said first one of said shingles while the folded over upper edge of the second one of said shingles underlays both the bottom surface of said third one of said shingles and the gutter of said first one of said shingles such that water migrating around the second lateral edge of the third one of said shingles in the S-shaped fold of the first one of said shingles is caught by the gutter of the first one of said shingles and is channeled by said gutter of the first one of said shingles onto the top surface of the second one of said shingles.*

[11. The roofing system of claim 10, wherein the second lateral edge of a third one of said shingles is inserted into the S-shaped fold of said first one of said shingles in such a manner that the gutter of said first one of said shingles underlays the bottom surface of said third one of said shingles such that water migrating around the second lateral edge of the third one of said shingles in the S-shaped fold of the first one of said shingles is caught by the gutter of the first one of said shingles and is channeled by said gutter of the first one of said shingles onto the top surface of the second one of said shingles.]

12. A roofing system comprising a plurality of shingles in which each shingle is an elongated rectangular sheet with a top surface and a bottom surface extending between an upper edge and a lower edge and between a first lateral edge and a second lateral edge, said sheet of each of said shingles having a plurality of S-shaped folds in laterally spaced relation to each other, each of said S-shaped folds extending substantially from the upper edge to the lower edge and with alternate ones of said S-shaped folds in a shingle being folded in opposite directions from adjacent folds on either side such that alternate portions of the top surface between the S-shaped folds are higher than adjacent portions of the top surface.

13. The roofing system of claim 12, wherein the S-shaped fold nearest the first lateral edge of each shingle is spaced a distance inwardly from the first lateral edge and the S-shaped fold nearest the second lateral edge of each shingle is spaced a distance inwardly from the second lateral edge, and wherein the second lateral edge of a first one of said shingles is received in the S-shaped fold in a second one of said shingles that is nearest the first lateral edge of the second one of said shingles such that the-distance between the first lateral edge and the S-shaped fold nearest the first lateral edge of the second one of said shingles underlays the second lateral edge of the first one of said shingles.

14. The roofing system of claim 13, wherein the first lateral edge of said second one of said shingles is folded over toward the top surface of the second one of said shingles to form a gutter between the folded over first lateral edge and the nearest S-shaped fold to the first lateral edge of the second one of said shingles, which gutter of the second one of said shingles underlays a portion of the first one of said shingles adjacent the second lateral edge of the first one of said shingles.

15. The roofing system of claim 14, wherein the second lateral edge of the first one of said shingles and the first lateral edge of the second one of said shingles are positioned to partially overlay the top surface of a third one of said shingles such that water migrating around and under the second lateral edge of the first one of said shingles is caught and channeled by the gutter in the second one of said shingles onto the top surface of the third one of said shingles.

*16. The roofing system of claim 13, wherein the first lateral edge of said second one of said shingles is bent to protrude from the top surface of the second one of said shingles in a direction extending away from the bottom surface to form a gutter between the bent first lateral edge and the nearest S-shaped fold to the first lateral edge of the second one of said shingles, which gutter of the second one of said shingles underlays a portion of the first one of said shingles adjacent the second lateral edge of the first one of said shingles.*

*17. The roofing system of claim 16, wherein the second lateral edge of the first one of said shingles and the first lateral edge of the second one of said shingles are positioned to partially overlay the top surface of a third one of said shingles such that water migrating around and under the second lateral edge of the first one of said shingles is caught and channeled by the gutter in the second one of said shingles onto the top surface of the third one of said shingles.*

*18. The roofing system of claim 13, wherein said first lateral edge of the second one of said shingles is folded.*

*19. The roofing system of claim 10, wherein said portion of said third one of said shingles that overlays the gutter of the first one of said shingles and extends to the second lateral edge of said third one of said shingles is substantially planar.*

*20. The roofing system of claim 19, wherein said portion of said third one of said shingles that overlays the gutter of the first one of said shingles and extends into the S-shaped fold of the first one of said shingles is substantially planar.*

*21. A roofing system, comprising:*

*a plurality of a first type of shingle, wherein each of said first type of shingle has;*

*a top surface and a bottom surface terminating in opposing upper edge and lower edge and in opposing first lateral edge and second lateral edge;*

*said upper edge of the first type of shingle having an upper lip that is folded over said top surface;*

*said lower edge of the first type of shingle having a lower lip that is folded under said bottom surface;*

*said first lateral edge of the first type of shingle having a first gutter with a first gutter surface between a first side wall and a first S fold, said first S fold extending between said first gutter surface and the top surface;*

*said second lateral edge of the first type of shingle having a second gutter side wall and a second S fold, said second S fold extending between said second gutter surface and the top surface; and*

*a plurality of a second type of shingle, wherein each of said second type of shingle has a top surface and a bottom surface terminating in opposing upper edge and lower edge and in opposing first lateral edge and second lateral edge;*

*said upper edge of the second type of shingle having an upper lip that is folded over said top surface;*

*said lower edge of the second type of shingle having a lower lip that is folded under said bottom surface;*

*said first lateral edge of the second type of shingle having a first tongue portion that extends substantially coplanar with said top surface and said bottom surface; and*

*said second lateral edge of the second type of shingle having a second tongue portion that extends substantially coplanar with said top surface and said bottom surface, and further wherein:*

*said upper lip of the second type of shingle is adapted to engage the upper lip of said first type of shingle that is positioned adjacent said lower lip of said second type of shingle;*

*said first tongue portion is adapted to extend over the second side wall and second gutter surface into engagement with the second S fold of said first type of shingle that is positioned adjacent said first tongue portion of said second type of shingle; and*

*said second tongue portion is adapted to extend over the first side wall and first gutter surface into engagement with a first S fold of said first type of shingle that is positioned adjacent said second tongue portion of said second type of shingle.*

* * * * *